United States Patent [19]

Teramoto et al.

[11] Patent Number: 4,974,014

[45] Date of Patent: Nov. 27, 1990

[54] PHOTOGRAPHIC VIEWFINDER ASSEMBLY

[75] Inventors: Togo Teramoto; Syunji Oku; Yasuhiro Miyoshi; Mamoru Katsuragi, all of Osaka, Japan

[73] Assignee: Minolta Camera Kabushiki Kaisha, Osaka, Japan

[21] Appl. No.: 487,206

[22] Filed: Mar. 20, 1990

Related U.S. Application Data

[62] Division of Ser. No. 349,092, May 9, 1989, Pat. No. 4,926,208.

[30] Foreign Application Priority Data

| May 9, 1988 | [JP] | Japan | 63-113372 |
| May 9, 1988 | [JP] | Japan | 63-113373 |
| May 9, 1988 | [JP] | Japan | 63-113374 |
| May 9, 1988 | [JP] | Japan | 63-113375 |

[51] Int. Cl.$^5$ .......................... G03B 7/99; G03B 13/02
[52] U.S. Cl. ...................... 354/478; 354/225
[58] Field of Search .............. 354/478, 219, 224, 225, 354/155

[56] References Cited

U.S. PATENT DOCUMENTS

| 3,620,147 | 11/1971 | Ataka et al. | 354/478 X |
| 4,278,339 | 7/1981 | Uchida et al. | 354/155 |
| 4,341,448 | 7/1982 | Toyoda et al. | 354/478 |
| 4,445,765 | 5/1984 | Yamamoto | 354/478 |
| 4,615,602 | 10/1986 | Egushi | 354/478 |

FOREIGN PATENT DOCUMENTS

| 44-17348 | 7/1969 | Japan . |
| 47-20836 | 7/1972 | Japan . |
| 47-24420 | 8/1972 | Japan . |
| 47-33314 | 10/1972 | Japan . |
| 47-33315 | 10/1972 | Japan . |
| 47-33317 | 10/1972 | Japan . |

Primary Examiner—W. B. Perkey
Attorney, Agent, or Firm—Price, Gess & Ubell

[57] ABSTRACT

A viewfinder assembly which comprises a viewfinding mirror module of one-piece construction including a pair of major roof mirrors laid at a predetermined acute angle (90°) relative to each other, side walls continued from respective lower edges of the roof mirrors to support such roof mirrors and an eyepiece support frame positioned rearwardly of the viewfinding mirror module. Each of the side walls has a lower edge formed integrally with elastic fitting pawls for the fitting of the viewfinding mirror module to the camera body. In order to mount the viewfinding mirror module, the viewfinding mirror module is first mounted on the viewfinder holder with the fitting pawls engaged in holes in the viewfinder holder. To connect the eyepiece to the viewfinding mirror module, the eyepiece is retained in position between a light measuring lens holder fixed on an upper surface of the eyepiece support frame and the major roof mirrors which are covered by the protective cover above which the flexible printed circuit board is mounted.

8 Claims, 7 Drawing Sheets

PHOTOGRAPHIC VIEWFINDER ASSEMBLY

This is a division of application Ser. No. 349,092, filed May 9, 1989, now U.S. Pat. No. 4,926,208.

BACKGROUND OF THE INVENTION

1. Field of the Invention

The present invention generally relates to a viewfinder assembly in a photographic camera and, more particularly, to the support of the viewfinder assembly, the connection of an eyepiece lens or a light measuring lens holder to the viewfinder assembly, and the protection of the viewfinder assembly.

2. Description of the Prior Art

As a substitute for a pentagonal roof prism forming the major component part of the photographic viewfinder of the single reflex camera, a viewfinding mirror module is currently utilized which comprises a plurality of reflecting mirrors so arranged and so positioned as to represent an appearance similar to the traditional prism. In general, the prior art viewfinding mirror module is of one-piece construction formed by the use of any known plastics molding technique, including a pair of major roof mirrors laid at a predetermined acute angle (90°) relative to each other, side walls continued from respective lower edges of the roof mirrors to support such roof mirrors on a camera body, and an eyepiece support frame positioned rearwardly of the viewfinding mirror module. The viewfinding mirror module of the above described construction is fixedly mounted on a camera body either directly or through a viewfinder holder.

To mount the viewfinding mirror module on the camera body, various methods have hitherto been used. For example, according to the Japanese Utility Model Publication No. 47-24420, published Aug. 2, 1972, the use is made of tension spring members between the viewfinding mirror module and the camera body to retain the former resiliently in position on the camera body thereby to avoid any possible deformation of one or both of the major roof mirrors. According to the Japanese Utility Model Publication No. 47-33317, published Oct. 7, 1972, the viewfinding mirror module is fixedly mounted on the camera body by the use of set screws positioned beneath an eyepiece support frame and isolated in position from the major roof mirrors to avoid any possible build-up of stresses on the major roof mirrors.

According to the first mentioned method wherein the use has been made of the tension spring members, the tension spring members used has been found minimizing the effective utilization of a space exterior of and in the vicinity of the viewfinding mirror module. For example, if a flexible printed circuit board such as generally used in electronically controlled photographic cameras is mounted on and arranged exteriorly above the major roof mirrors, the presence of the tension spring members tends to constitute a cause of an increase in size of the camera body.

On the other hand, according to the second mentioned method wherein the set screws are used, the avoidance of the stress build-up on the major roof mirrors necessitates the screw member to be positioned at respective locations isolated from the major roof mirrors and, therefore, the eyepiece support area tends to protrude rearwardly away from the viewfinder mirror module with the freedom of layout limited consequently.

Although the use may be contemplated of a bonding agent to secure the viewfinding mirror module on the camera body, there may be a possibility that the bonding agent when cured undergoes a contraction to such an extent as to result in one or both of the major roof mirrors departing from a required geometric layout. A certain type of bonding agent such as containing, for example, silicone will hardly contract even when cured, however, it requires a long time to cure completely accompanied by a reduction in work efficiency. Considering the contraction and the curing time, the use of UV type bonding agent appears to be ideal, however, problematic in that relatively complicated facilities are required.

Also, as far as the retention of the eyepiece is concerned, it is a general practice to secure the eyepiece with the use of a bonding agent to the eyepiece support frame formed integrally with the major roof mirrors by the use of the plastics molding technique such as disclosed in, for example, the Japanese Utility Model Publication No. 47-33314, published Oct. 7, 1972. However, the use of the bonding agent to secure the eyepiece generally has a problem in that the preciseness with which the major roof mirrors are positioned tends to be adversely affected. Even though the silicone type bonding agent which is generally considered substantially free from contraction during a curing process is employed, the preciseness with which the major roof mirrors are positioned tends to be adversely affected due to the difference in coefficient of thermal expansion between the eyepiece and the viewfinding mirror module at relatively high or low temperature. As is well known to those skilled in the art, the lack of the positioning preciseness results in the presentation of a deformed or exaggerated image of the object or scene as it appears in the field of view of the lens.

When it comes to a light measuring lens or light measuring element generally positioned at a light exit surface of a pentagonal solid prism, the prior art is such that the light measuring lens or light measuring element is supported by a prism holder for the support of the pentagonal prism either directly or through an eyepiece holder.

When the above described technique generally practiced in the environment in which the solid prism is used is employed for securing the light measuring lens or light measuring element in the viewfinding mirror module, the following problems arise. Specifically, while in the viewfinding mirror module a light measuring opening in the vicinity of the light exit side where the eyepiece is fitted has to be sealed for dust-proof, a gap is necessary between the viewfinding mirror module and the light measuring lens or light measuring element where the latter is to be supported by the viewfinder holder and, therefore, the viewfinding mirror module cannot be completely sealed. Also, in order for the light measuring lens or light measuring element to be retained by the viewfinder holder, pillars stand on respective sides from the viewfinder holder while sandwiching the eyepiece, causing the viewfinding mirror module to become bulky.

Again, in the viewfinding mirror module, the major roof mirrors has to be precisely laid at an angle of 90° relative to each other. If this precise angle is not attained, an image of the object or scene appearing in the field of view of the lens will be viewed as deformed or exaggerated. In particular, where members having a coefficient of thermal expansion different from that of the viewfinding mirror module are secured to the viewfinding mirror module, the positioning preciseness of the roof mirrors tends to be adversely affected at high or low temperature due to the difference in coefficient of thermal expansion.

In recent models of single lens reflex cameras having light-weight and compact features, the flexible printed circuit board having IC elements and other electric component parts mounted thereon is generally installed within a space delimited between the solid prism and a cover for protecting the solid prism because a relatively large space is available above the solid prism.

The installation of the flexible printed circuit board within a space between the viewfinding mirror module and the cover protecting the viewfinding mirror module is also disclosed in, for example, the Japanese Laid-open Utility Model Publication No. 53-494244, published in 1978.

However, since, unlike the viewfinder employing the solid prism, the viewfinding mirror module is formed by the use of the plastics molding technique, the viewfinding mirror module is susceptible to deformation when an external force is applied thereto. In particular, as hereinbefore discussed, the lack of the preciseness in positioning of the major roof mirrors results in the presentation of a deformed or exaggerated image of the object or scene as it appears in the field of view of the lens.

Accordingly, when the flexible printed circuit board is mounted direct on the viewfinding mirror module, and when the upper casing of the camera body is subsequently mounted thereover, the upper casing may press the major roof mirrors causing the latter to depart from the predetermined geometrical relationship with each other.

SUMMARY OF THE INVENTION

Accordingly, the present invention has for its primary object to provide an improved viewfinder assembly for a photographic camera utilizing a viewfinding mirror module which can be mounted on the camera body without affecting the positioning preciseness of the major roof mirrors and which has no limitation to a space exteriorly above the viewfinding mirror module can be effectively utilized.

Another important object of the present invention is to provide an improved viewfinder assembly of the type referred to above, wherein the light measuring opening at the side of the eyepiece can be completely closed by the use of the light measuring lens and the light measuring element and which will not adversely affect the positioning preciseness of the major roof mirrors.

A further object of the present invention is to provide an improved viewfinder assembly of the type referred to above, which is completely free from the problem associated with the use of the bonding agent, that is, which is free from deterioration in positioning preciseness of the major roof mirrors which would result from the contraction of the bonding agent when the latter is cured and which is also free from deterioration in positioning preciseness of the major roof mirrors at high and low temperatures as a result of the difference in coefficient of thermal expansion which may occur when the eyepiece is bonded with the viewfinding mirror module.

A still further object of the present invention is to provide an improved viewfinder of the type referred to above, wherein even when the flexible printed circuit board is installed within the space delimited between the viewfinding mirror module and an upper casing mounted atop the camera body, no external force will act on the viewfinding mirror module, particularly the major roof mirrors.

In order to accomplish these objects, the present invention provides an improved viewfinder assembly which comprises a viewfinding mirror module of one-piece construction including a pair of major roof mirrors laid at a predetermined acute angle relative to each other, side walls continued from respective lower edges of the roof mirrors to support such roof mirrors and an eyepiece support frame positioned rearwardly of the viewfinding mirror module. Each of the side walls has a lower edge formed integrally with an elastic fitting pawl means for the fitting of the viewfinding mirror module to the camera body. In order to mount the viewfinding mirror module, the viewfinding mirror module is first mounted on the viewfinder holder with the fitting pawl means engaged by the receiving means in the viewfinder holder. To connect the eyepiece to the viewfinding mirror module, the eyepiece is retained in position between a light measuring lens holder fixed on an upper surface of the eyepiece support frame and the major roof mirrors which are covered by the protective cover above which the flexible printed circuit board is mounted.

BRIEF DESCRIPTION OF THE DRAWINGS

These and other objects and features of the present invention will become clear from the following description taken in conjunction with the preferred embodiments thereof with reference to the accompanying drawings, in which:

FIG. 3 is an exploded view of an important portion of the viewfinder assembly of the present invention as viewed from front;

DETAILED DESCRIPTION OF THE INVENTION

Figure 1:
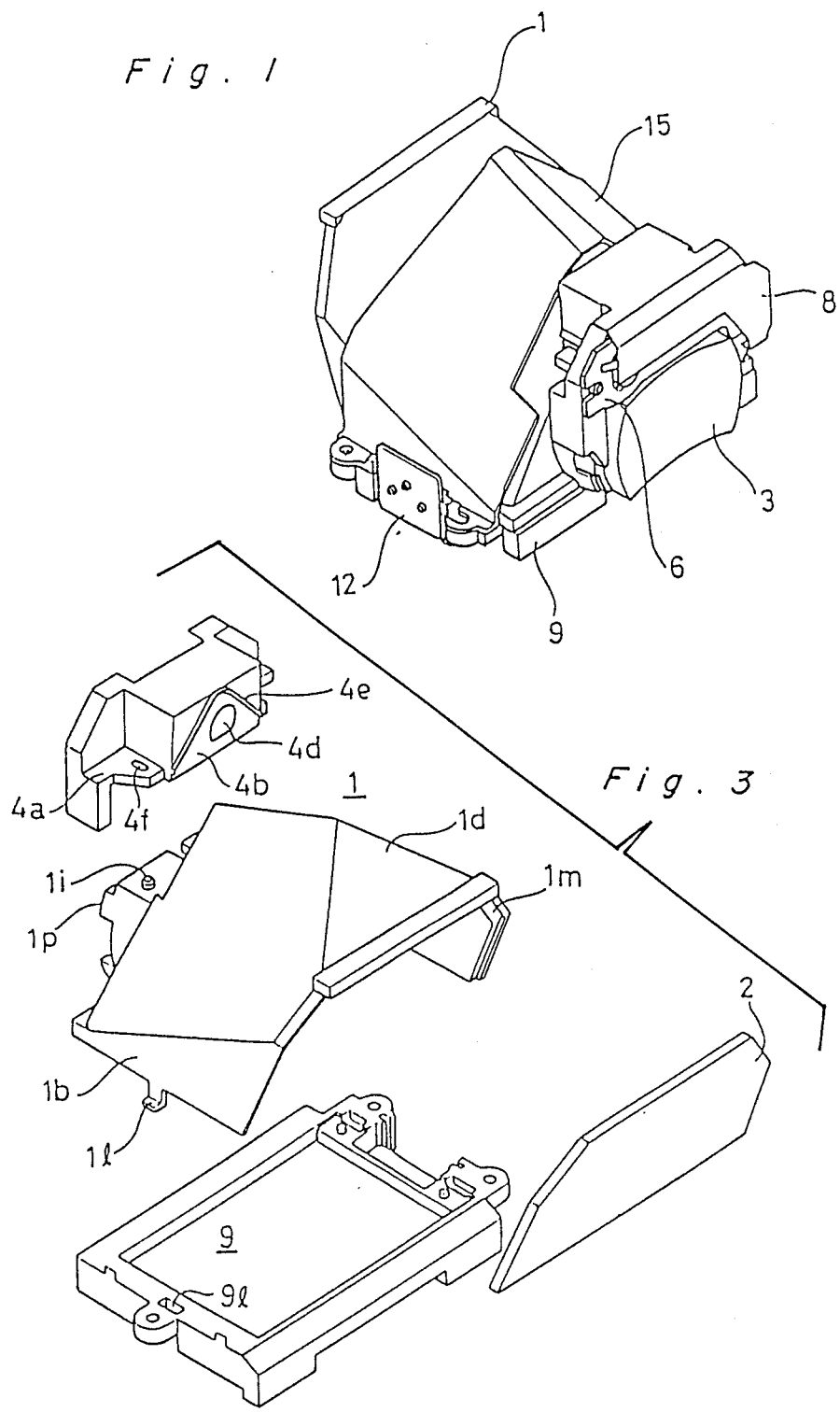
FIG. 1 perspective view of a viewfinder assembly embodying the present invention as viewed from rear.

Before the description of the present invention proceeds, it is to be noted that like parts are designated by like reference numerals throughout the accompanying drawings. It is also to be noted that the terms "front" and "rear" used hereinbefore and hereinafter in connection with component parts of the viewfinding mirror module are to be understood as used relative to the direction in which the photographic camera is aimed at an object or scene to be photographed.

Figure 2:
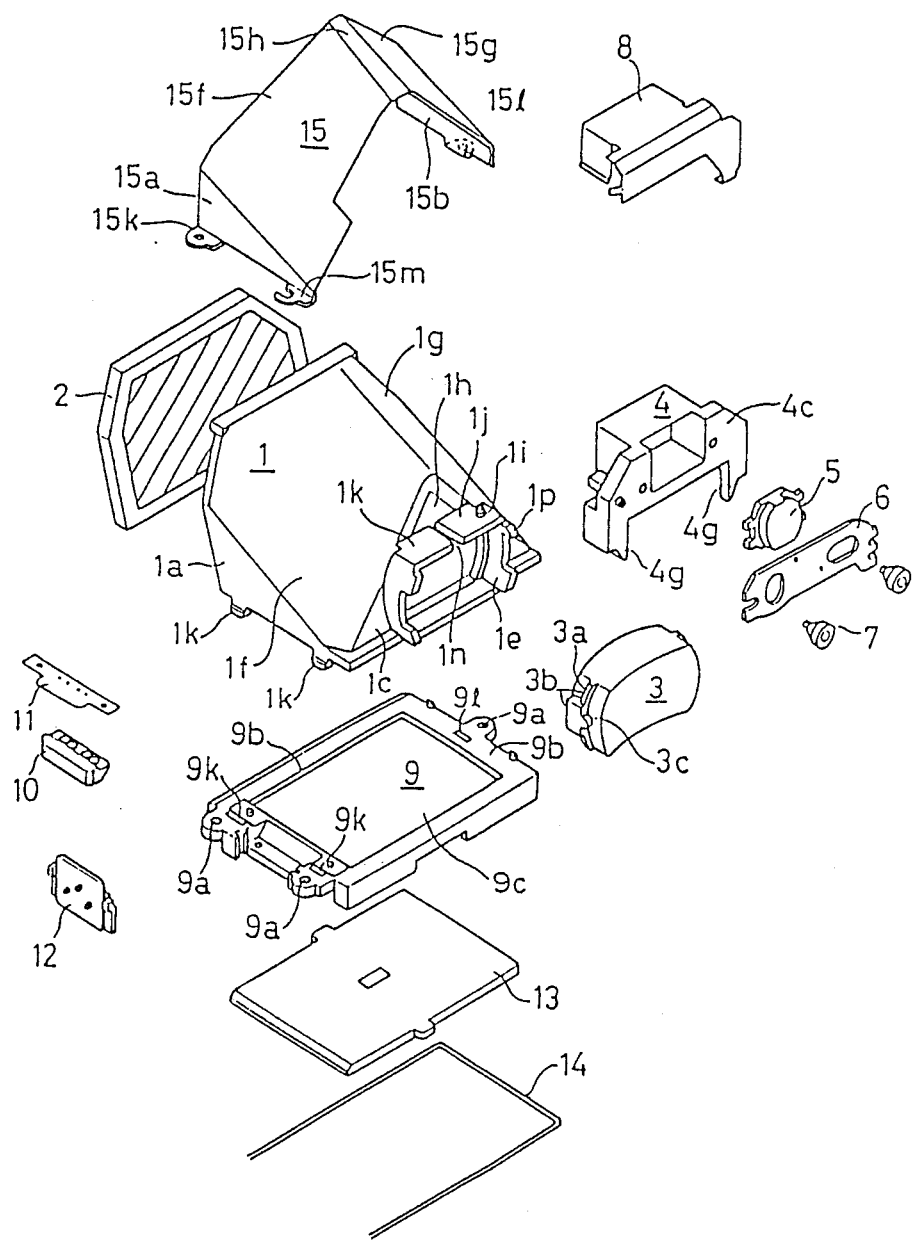
FIG. 2 is an exploded view of the viewfinder assembly shown in FIG. 1.

Referring first to FIGS. 1 to 3, a viewfinder assembly according to the present invention generally comprises a viewfinding mirror module, generally identified by 1, a protective cover 15, a viewfinder holder 9 and a light measuring lens holder 4. The viewfinding mirror module 1 includes a pair of roof mirrors 1f and 1g jointed at upper edges together at a predetermined acute angle (90°) relative to each other and having respective inner surfaces formed as reflecting surfaces; a side wall 1a or 1b continued from a lower edge of each of the roof mirrors 1f and 1g in a direction downwards from the associated roof mirror 1f or 1g; a rear wall 1c having formed therein an eyepiece support frame 1e and an opening 1h for the passage therethrough of light fluxes to be measured in light measuring operation; and a generally triangular front upper wall 1d.

The side wall 1a has its lower edge formed integrally with a plurality of, for example, two, fitting legs 1k so as to extend downwards therefrom whereas the side wall 1b confronting the side wall 1a has its lower edge formed integrally with a fitting leg 1l so as to extend downwards therefrom. The roof mirrors 1f and 1g and the side walls 1a and 1b have respective front edges formed with attachment faces 1m to which a second reflecting mirror 2 for guiding rays of light, coming from an object and reflected forwards by the roof mirrors 1f and 1g, towards an eyepiece assembly is fitted.

The eyepiece support frame 1e integral with the rear wall 1c protrudes rearwards therefrom and has four side wall members integrated so as to represent a generally rectangular shape. Of these four side wall members forming the eyepiece support frame 1e, the upper side wall member has a cutout 1n defined therein so as to separate the upper side wall member into two side wall pieces 1j and 1k. The function of said cutout 1n is to avoid any possible deformation of one or both of the roof mirrors 1f and 1g which would otherwise occur upon shrinkage during the molding. The side wall piece 1j has a positioning boss 1i formed thereon for the positioning of the light measuring lens holder 4 as will be described later.

The above described viewfinding mirror module 1 having the various elements 1a to 1m is of one-piece construction formed by the use of any known plastics molding technique.

Reference numeral 3 represents a generally rectangular eyepiece made of plastics. This eyepiece 3 is of one-piece construction, having left-hand and right-hand end faces formed with flanges 3a protruding laterally outwards, each of said flanges 3a being formed with an abutment face 3b orthogonal to the optical axis of the eyepiece and a protuberance 3c extending in opposition to the abutment face 3b.

The light measuring lens holder 4 is similarly of one-piece construction formed by the use of any known plastics molding technique, including a lower face 4a formed with a slot 4f, a front face 4b formed with a light measuring opening 4d and a light shielding hood 4e, and a rear face 4c formed with downwardly extending pawls 4g. A light measuring lens 5 is fixedly retained by the lens holder 4 at a location rearwardly of the front face 4b, while a carrier substrate 6 having at least one light measuring element (not shown) mounted thereon is adjustably fitted to the rear face 4c and above the pawls 4g by means of eccentric pin members 7.

Mounted over the lens holder 4 that is secured to the eyepiece support frame 1e integral with the viewfinding mirror module 1 is a noise shielding plate 8 which is, as best shown in FIG. 1, secured to the lens holder 4 so as to cover the carrier substrate 6.

The viewfinder holder 9, generally rectangular in shape, is positioned immediately below the viewfinding mirror module 1. This viewfinder holder 9 has defined therein a plurality of fitting holes 9a for the attachment thereof to the camera body, engagement holes 9k and 9l for receiving the fitting legs 1k and 1l integral with the respective side walls 1a and 1b of the viewfinding mirror module 1, and a rectangular opening 9c for the passage of the incoming light flux therethrough towards the eyepiece. It is to be noted that the peripheral lip region 9b of the viewfinder holder 9 around the rectangular opening 9c defines a viewfinder's field of view.

Secured from below to the viewfinder holder 9 is a focusing screen 13 which is retained in position inside the viewfinder holder 9 by means of a wire spring 14.

Reference numeral 12 represents a light emitting device for the display of exposure information and focus condition information, etc., near the viewfinder image area; reference numeral 10 represents a light guide employed in the form of a prism; and reference numeral 11 represents a display film corresponding to the information display. All of the light emitting device 12, the light guide 11 and the display film 12 are mounted on the viewfinder holder 9.

The protective cover 15 in the form of a sheet metal so shaped as to have a roof-shaped body including a pair of roofs 15f and 15g lying at a predetermined acute angle, for example, 90° or greater, relative to each other, and a flat ridge area 15h lying between the roof areas 15f and 15g. The protective cover 15 also includes a pair of side walls 15a and 15 b continued downwardly from respective lower edges of the roof areas 15f and 15g, one of said side walls 15a having a lower edge formed with a pair of fitting lugs 15k and 15m while the other of said side walls 15 b has a lower edge formed with a fitting lug 15l. The protective cover 15 of the above described construction is preferably formed and shaped by the use of any known press work from a sheet metal. The fitting lugs 15k, 15m and 15l are used to secure the protective cover 15 to the camera body, with the viewfinding mirror module 1 positioned inwardly thereof, by means of set screw members which are also used to secure the viewfinder holder 9 to the camera body.

Hereinafter, the manner by which the viewfinding mirror module 1 and the viewfinder holder 9 are coupled together will be described with particular reference to FIGS. 4 to 6.

Figure 4:
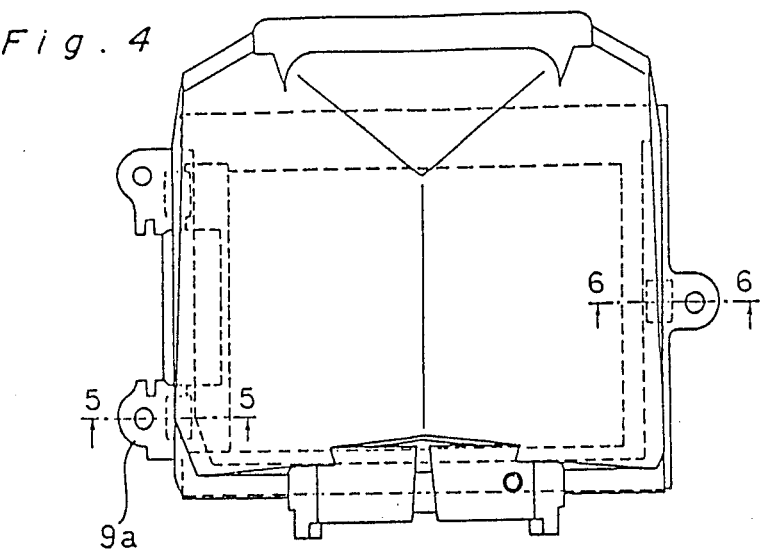
FIG. 4 is a top plan view of the viewfinder assembly showing the connection between the viewfinding mirror module and a viewfinder holder.

FIG. 4 illustrates a condition in which the viewfinding mirror module 1 and the viewfinder holder 9 are completely coupled together, which condition is as viewed from top. FIGS. 5 and 6 are cross-sectional views taken along the lines E13 E and F13 F in FIG. 4, showing the details of the engagement of one of the fitting legs 1k integral with the side wall 1a in the associated engagement hole 9k in the viewfinder holder 9 and the engagement of the fitting leg 1l integral with the side wall 1a in the associated engagement hole 9l. The mounting of the viewfinding mirror module 1 onto the viewfinder holder 9 can be accomplished by first inserting the fitting legs 1k into the respective engagement holes 9k and subsequently pressure-fitting the fitting leg 1l into the engagement hole 9l. At the time of mounting of the viewfinding mirror module 1 onto the viewfinder holder 9, the second reflecting mirror 2 has not yet been glued to the viewfinding mirror module 1, therefore, the viewfinding mirror module 1 can elastically yield during the actual mounting operation thereon onto the viewfinder holder 9 and restore to the initial shape after such mounting operation. Therefore, no stress will be left in any one of the major roof mirrors 1f and 1g.

Figures 5, 6:
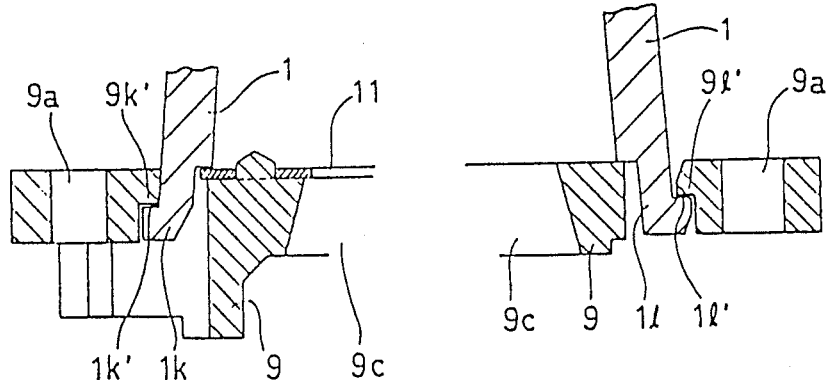
FIGS. 5 and 6 are fragmentary cross-sectional views, on an enlarged scale, taken along the lines E—E and F—F in FIG. 4, respectively.

When and after the viewfinding mirror module 1 has been mounted on the viewfinder holder 9, respective toes 1k', integral with the fitting legs 1k are trapped by overhangs 9k', formed in the holder 9 so as to confront the associated engagement holes 9k as shown in FIG. 5 and a toe 1l' integral with the fitting leg 1l is trapped by an overhang 9l' formed in the holder 9 so as to confront the engagement hole 9l as shown in FIG. 6, thereby allowing the viewfinding mirror module 1 to be firmly retained on the viewfinder holder 9. Therefore, any possible separation between the viewfinding mirror module 1 and the viewfinder holder 9 upon receipt of impacts or vibrations can be advantageously avoided. It is to be noted that, since in the mounted condition a clearance is provided between each toe 1k' and the respective overhang 9k' and also between the toe 1l' and the associated overhang 9l', the stresses which will be developed during the mounting operation of the viewfinding mirror module 1 onto the viewfinder holder 9 will bring no adverse influence on the viewfinding mirror module 1.

It is to be noted that the number and the position of the fitting legs 1k and 1l necessary for the viewfinding mirror module 1 to be coupled with the viewfinder holder 9 may not be limited to those shown and described. For example, each of the side walls 1a and 1b may have two fitting legs and/or at least one similar fitting leg may be integrally formed with the rear wall 1c. However, it has been found that, if the engagement holes 9k and 9l for the receipt of the respective fitting legs 1k and 1l are defined at respective locations in the vicinity of the fitting holes 9a in the manner as shown, the maximized utilization of a space can be attained.

Also, since the bottom of the viewfinding mirror module 1 is open downwards, it is generally recommended that the viewfinding mirror module 1 is assembled into a single unitary structure together with the focusing screen 13 for the purpose of avoiding any possible ingress of dusts into the viewfinding mirror module 1 during the mounting operation of the viewfinder onto the camera body. Therefore, according to the illustrated embodiment of the present invention, the viewfinding mirror module 1 is mounted on the viewfinder holder 9 to accomplish the unitary structure. However, in the practice of the present invention, the mounting operation of the viewfinding mirror module 1 onto the viewfinder holder 9 may be carried out subsequent to the mounting of the viewfinder holder 9 onto the camera body. Alternatively, an element corresponding to the viewfinder holder 9 may be integrally formed with the camera body so that the viewfinding mirror module 1 can be directly mounted on such element integral with the camera body. The use of the viewfinder holder 9 is however preferred for the purpose of dust-proof and/or for the adjustment of a location of a viewfinder.

Figure 7A:
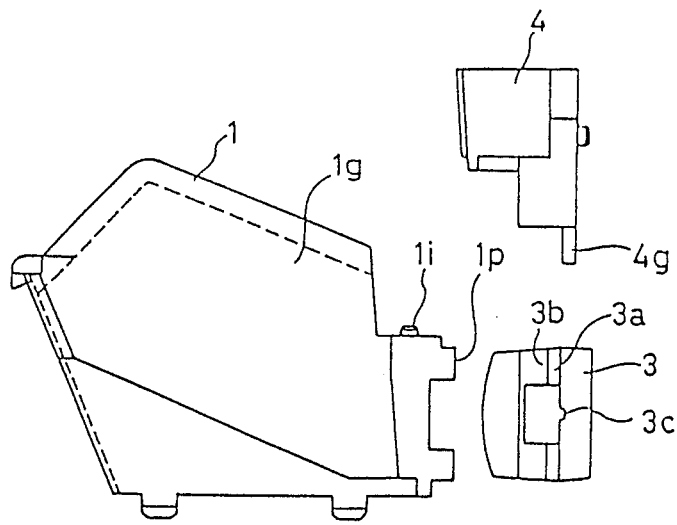
FIGS. 7(a) and 7 (b) are side views of the viewfinder assembly showing the connection between the viewfinding mirror module and both of an eyepiece and a light measuring lens holder.
Figure 7B:
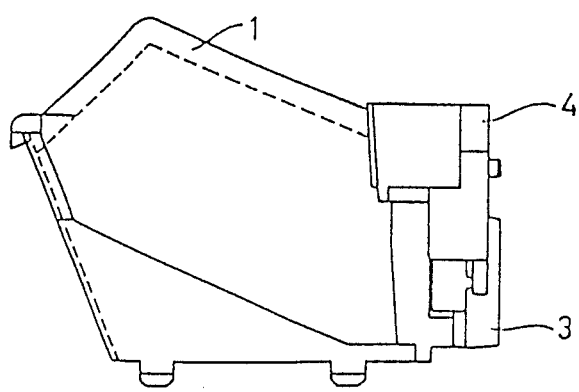

The mounting of the eyepiece 3 and the light measuring lens holder 4 to the viewfinding mirror module 1 will now be described in detail with particular reference to FIGS. 7(a) and 7(b).

According to the present invention, the eyepiece 3 is supported in position firmly on the viewfinder with no bonding agent employed. For this purpose, when the eyepiece 3 is inserted into the eyepiece support frame 1e, the eyepiece 3 is retained in position between the eyepiece support frame 1e and the lens holder 4 with the abutment faces 3b contacting end faces 1p of the lateral side wall members of the eyepiece support frame 1e and also with the protuberances 3c contacting the pawls 4g integral with the lens holder 4, under pressure enough to avoid any possible jolt of the eyepiece 3 relative to the eyepiece support frame 1e. After the insertion of the eyepiece 3 into the eyepiece support frame 1e, the lens holder 4 is bonded to the eyepiece support frame 1e by the use of a bonding agent. The bonding agent is applied only to one of the upper side wall member of the eyepiece support frame 1e where the positioning boss 1i is formed, that is, the side wall piece 1j.

Since the eyepiece 3 and the lens holder 4 are connected to the eyepiece support frame 1e in the manner as hereinabove described, the problem inherent in the prior art which often occurred when the eyepiece 3 is bonded to the eyepiece support frame 1e with the use of the bonding agent, specifically an possible adverse influence on the major roof mirrors 1f and 1g as a result of shrinkage during the curing the bonding agent and as a result of thermal stress which result from the difference in coefficient of thermal expansion between the viewfinding mirror module 1 and the eyepiece 3, can be advantageously avoided. Also, where the bonding agent is applied to an upper surface of both of the side wall pieces 1k and 1j such as practiced according to the prior art, the difference in coefficient of thermal expansion between the viewfinding mirror module 1 and the lens holder 4 has created a problem similar to that occurring between the eyepiece 3 and the eyepiece support frame 1e with the use of the bonding agent. However, according to the illustrated embodiment of the present invention, since the bonding agent is applied only to the side wall piece 1j and the opposite side wall piece 1k is allowed to move freely, the difference in expansion resulting from a change in temperature can be absorbed by the cutout 1n defined between the side wall pieces 1k and 1j with the side wall piece 1k allowed to move relative to the side wall piece 1j. Therefore, a highly precise viewfinder assembly can be fabricated which is effective to present an image of the object or scene, neither deformed nor exaggerated, to the photographer.

Although in the foregoing embodiment the lens holder 4 is employed for connecting the eyepiece 3 to the viewfinding mirror module 1, the use of the lens holder 4 for this purpose is not always essential and may not be used. In such case, elements corresponding to the protuberances 3c in the eyepiece 3 should be formed in the noise shield plate 8 so that, when the noise shield plate is subsequently mounted, the resiliency exerted thereby can be utilized to secure the eyepiece 3 in position within the eyepiece support frame 1e.

Also, although the light measuring lens 5 and the light measuring element have been described as mounted on the light measuring lens holder 4, separate holders may be employed for the light measuring lens and the light measuring element, respectively. In such case, either the holder for the light measuring lens or the holder for the light measuring element may be employed to secure the eyepiece 3 to the eyepiece support frame 1e in the manner as hereinabove described.

As compared with the eyepiece 3 and the light measuring lens 5 supported by the eyepiece support holder independent from the viewfinding mirror module 1, the direct mounting of both of the eyepiece 3 and the light measuring lens holder 4 onto the viewfinding mirror module 1 according to the present invention is effective to provide a highly sealed feature and, hence, a high dust-proof feature of the viewfinding mirror module 1.

The details of the protective cover 5 will now be described with particular reference to FIGS. 8 to 10.

In the practice of the present invention, a space delimited between the protective cover 15 and an upper casing mounted atop the camera body is used to accommodate the flexible printed circuit board having IC components and other circuit components mounted thereon. In photographic cameras utilizing a number of parts made of plastics, it often occurs that some of the IC components mounted on the printed circuit board tend to undergo an erroneous operation under the influence of noises generated from, for example, a reflex-mirror drive mechanism using plastics. Therefore, in preferred embodiment of the present invention, a sheet metal is used as material for the protective cover 15 and, when the protective cover 15 is electrically connected to earth, a noise shielding effect can be attained. For this purpose, it is recommended that the protective cover 15 be connected to a metallic part of the camera body through at least one screw member or a lead wire.

Also, while it is generally considered that the viewfinding mirror module is susceptible to heat, the presence of the protective cover 15 advantageously allows a soldering technique to be employed for mounting the circuit components on an electroconductive pattern on the flexible printed circuit board.

Figure 8A:
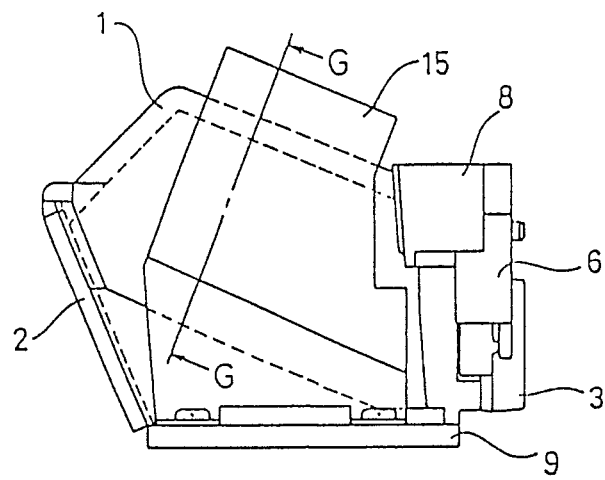
FIG. 8 (a) is a side view of the viewfinder assembly, showing another preferred embodiment of the present invention.
FIG. 8(b) is a cross-sectional view taken along the line G—G in FIG. 8(a)
Figure 8B:
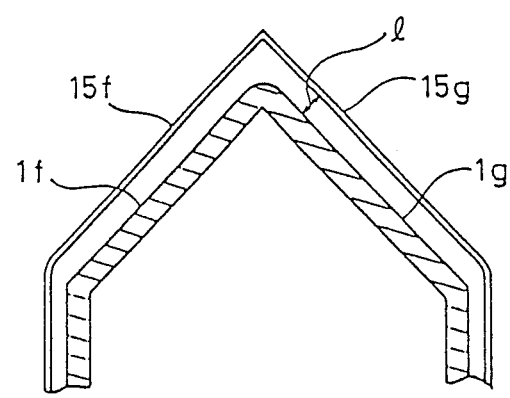

One preferred embodiment of the protective cover 15 is illustrated in FIGS. 8(a) and 8(b). As hereinbefore described, the protective cover has the roofs 15f and 15g. The protective cover 15 is so shaped that, when the protective cover 15 is mounted atop the viewfinding mirror module 1 in the manner as hereinbefore described, the roofs 15f and 15g of the protective cover 15 can assume a parallel relationship with the major roof mirrors 1f and 1g of the viewfinding mirror module 1, respectively to define a gap of uniform distance l between the roofs 15f and 15g and the major roof mirrors 1f and 1g. The smaller the distance l is, the larger can the space be available for the installation of the printed circuit board between the protective cover 15 and the upper casing on the camera body. However, the distance between the roofs 15f and 15g of the protective cover 15 and the major roof mirrors 1f and 1g of the viewfinding mirror module 1 is to be determined in consideration with the efficiency of fabrication so that the latter will not be reduced, and may be chosen to be within the range of 1 to 1.5 mm.

Figure 9A:
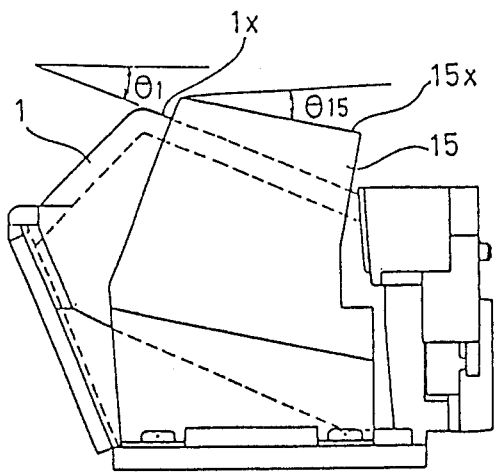
FIG. 9(a) is a view similar to FIG. 8(a), showing a modification thereof.
Figure 9B:
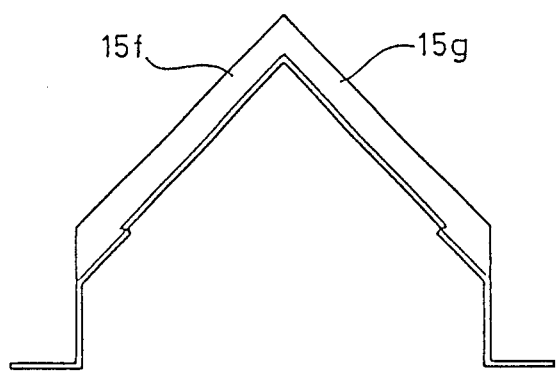
FIG. 9 (b) a rear elevational view of a protective cover for use in association with the viewfinder assembly of FIG. 9(a)

In another preferred embodiment of the protective cover 15 shown in FIGS. 9(a) and 9(b), at the front space atop the viewfinder assembly where the space for the installation of the flexible printed circuit board is relatively small, the distance between the protective cover 15 and the major roof mirrors 1f and 1g of the viewfinding mirror module 1 is minimized, whereas the distance is progressively increased towards the rear of the viewfinder assembly (towards the side of the eyepiece) since a relatively large space for the installation of the flexible printed circuit board is available at a location adjacent the eyepiece. Therefore, a sufficient space for the installation of the flexible printed circuit board is available even in this embodiment shown in FIG. 9 and the fabricating efficiency will not be lowered as compared with the embodiment shown in and described with reference to FIG. 8. More specifically, in the embodiment of FIG. 9, the protective cover 15 is so sized and so configured that the angle $\theta 15$ between the ridge 15x, defined by the joint of the roofs 15f and 15g of the protective cover 15, and the horizontal line be smaller than the angle $\theta 1$ between the ridge 1x defined by the joint of the major roof mirrors 1f and 1g of the viewfinding mirror module 1 and the horizontal line as shown in FIG. 9(a).

Figure 10A:
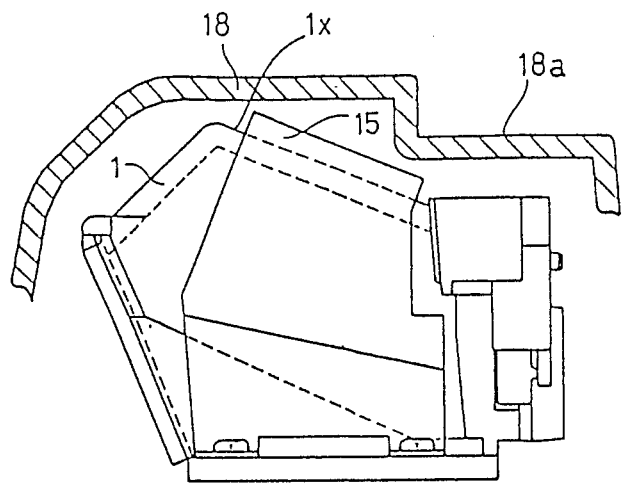
FIG. 10(a) is a view similar to FIG. 8(a), showing a further modification thereof.
Figure 10B:
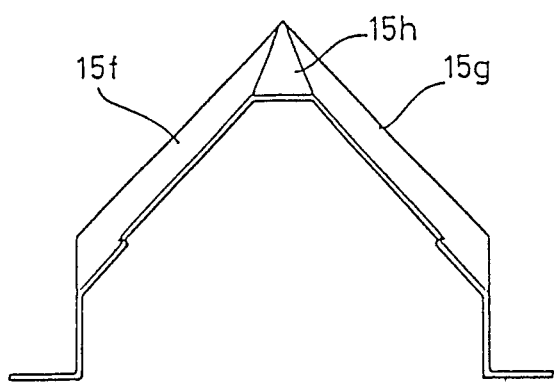
FIG. 10(b) is a view similar to FIG. 9(b), showing the protective cover for use in association with the viewfinding mirror module of FIG. 10(a).

In a further preferred embodiment of the protective cover 15 shown in FIGS. 10(a) and 10(b), at the ridge between the roofs 15f and 15g of the protective cover 15, a generally flat triangular area 15h is provided in the protective cover 15, which area 15h extends parallel to the ridge 1x between the major roof mirrors 1f and 1g of the viewfinding mirror module 1. More specifically, the angle between the flat triangular area 15h of the protective cover and the horizontal line is equal to the angle $\theta 1$ between the ridge 1x of the viewfinding mirror module 1 and the horizontal line. While in general a portion of the upper casing, shown by 18 in FIG. 10(a), on the camera body immediately above the eyepiece is lowered in level, as indicated by 18a in FIG. 10(a), relative to the other portion of the upper casing 18 for accommodating an accessary shoe, the use of the protective cover 15 according to the embodiment of FIG. 10 is advantageous in that the overall height of the photographic camera will not be increased unnecessarily and a sufficient space for the installation of the flexible printed circuit board can be available without adversely affecting the fabricating efficiency.

It is to be noted that the space between the protective cover 15 and the upper casing 18 on the camera body may not be always used for accommodating the flexible printed circuit board, but may be used for accommodating a buzzer, various switches, LCD and/or a solar cell with or without the printed circuit board.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A veiwfinder assembly for a photographic camera, which comprises:
   a viewfinding mirror module of one-piece construction formed by the use of a plastics molding technique, including a pair of major roof mirrors generally perpendicular to each other, first and second side walls continued from respective lower edges of the roof mirrors to support such roof mirrors, and an eyepiece support frame;

an eyepiece having first and second abutment faces formed therein, said first abutment face being engageable with an end face of the eyepiece support frame, said second abutment face extending in a direction counter to the first abutment face; and a sandwiching member fixed on an upper face of the eyepiece support frame, said members including a retaining member engageable with the protuberance of the eyepiece and cooperable with the end face of the eyepiece support frame to hold the eyepiece therebetween.

2. The viewfinder assembly as claimed in claim 1, wherein said second abutment face is a protuberance.

3. The viewfinder assembly as claimed in claim 2, wherein said first and second abutment faces are formed on a peripheral face of the eyepiece.

4. The viewfinder assembly as claimed in claim 3, wherein the sandwiching member is a light measuring holder for supporting at least a light measuring lens or a light measuring element.

5. A viewfinder assembly for a photographic camera, which comprises:

a viewfinding mirror module of one-piece construction formed by the use of a plastics molding technique, including a pair of major roof mirrors generally perpendicular to each other, first and second side walls continued from respective lower edges of the roof mirrors to support such roof mirrors, and an eyepiece support frame having an upper frame portion, said upper frame portion having an intermediate area opened to define two frame pieces;

a light measuring holder having at least a light measuring lens or a light measuring element carried thereby, said light measuring holder being fixed on only one of the frame pieces so as to close a light measuring opening which is defined by said upper frame portion of the eyepiece support frame and rear edges of the major roof mirrors of the viewfinding mirror module.

6. The viewfinder assembly as claimed in claim 5, wherein the holder is fixed on said one of the frame pieces by the use of a bonding agent.

7. The viewfinder assembly as claimed in claim 6, wherein said one of the frame pieces has a boss formed thereon, and wherein a portion of the holder corresponding in position to the boss is formed with a hole for engagement with the boss.

8. The viewfinder assembly as claimed in claim 5, wherein the holder cooperates with the eyepiece support frame to sandwich the eyepiece therebetween.

* * * * *